US008271514B2

(12) United States Patent
Geva (10) Patent No.: US 8,271,514 B2
(45) Date of Patent: Sep. 18, 2012

(54) CONTROLLING PRESENTATION OF REFINEMENT OPTIONS IN ONLINE SEARCHES

(75) Inventor: Shai Geva, Tel Aviv (IL)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/073,816

(22) Filed: Mar. 28, 2011

(65) Prior Publication Data

US 2011/0179055 A1 Jul. 21, 2011

Related U.S. Application Data

(63) Continuation of application No. 11/986,426, filed on Nov. 21, 2007, now Pat. No. 7,930,313.

(60) Provisional application No. 60/860,633, filed on Nov. 22, 2006.

(51) Int. Cl.
G06F 7/00 (2006.01)
(52) U.S. Cl. .................. 707/766; 707/775; 707/778
(58) Field of Classification Search .................. None
See application file for complete search history.

(56) References Cited

U.S. PATENT DOCUMENTS

| 5,544,360 | A | 8/1996 | Lewak et al. |
| 6,041,326 | A | 3/2000 | Amro et al. |
| 6,347,312 | B1 | 2/2002 | Byrne et al. |
| 6,553,367 | B2 | 4/2003 | Horovitz |
| 6,763,349 | B1 | 7/2004 | Sacco |
| 6,853,998 | B2 | 2/2005 | Biebesheimer et al. |
| 7,035,864 | B1 * | 4/2006 | Ferrari et al. ................ 1/1 |
| 7,062,483 | B2 | 6/2006 | Ferrari et al. |
| 7,325,201 | B2 | 1/2008 | Ferrari et al. |
| 2001/0044758 | A1 | 11/2001 | Talib et al. |
| 2002/0051020 | A1 | 5/2002 | Ferrari et al. |
| 2002/0128904 | A1 | 9/2002 | Carruthers et al. |

(Continued)

FOREIGN PATENT DOCUMENTS

WO WO 07/046080 4/2007

OTHER PUBLICATIONS

Faceted Metadata for Information Architecture and Search, CHI Course for CHI Apr. 2006, by Marti Hearst, et at http://flamenco.berkeley.edu/talks!chi course06.pdf.

(Continued)

*Primary Examiner* — Vei-Chung Liang
(74) *Attorney, Agent, or Firm* — Robert C. Kowert; Meyertons, Hood, Kivlin, Kowert & Goetzel, P.C.

(57) ABSTRACT

A method is provided that includes specifying enabling relationships, which map enabling sets of one or more enabling attribute-value pairs to respective enableable attributes. Responsively to the search query, a current state is designated that comprises current-state attribute-value pairs, and a result set is generated containing some of the items of a corpus. An enableable attribute of one of the enabling relationships is identified as enabled when the current-state attribute-value pairs include all of the enabling attribute-value pairs of the enabling relationship. A populated attribute-value pair is found that comprises the enabled attribute and a value therefor, and which, when added to the search query, results in an extended query that is satisfied by at least one of the items in the corpus. The result set is presented in association with the value of the populated attribute-value pair as a refinement option. Other embodiments are also described.

17 Claims, 7 Drawing Sheets

U.S. PATENT DOCUMENTS

| | | |
|---|---|---|
| 2003/0097357 A1 | 5/2003 | Ferrari et al. |
| 2003/0120630 A1 | 6/2003 | Tunkerlang |
| 2004/0117366 A1 | 6/2004 | Ferrari et al. |
| 2005/0038781 A1 | 2/2005 | Ferrari et al. |
| 2005/0149340 A1 | 7/2005 | Murakami et al. |
| 2007/0043627 A1 | 2/2007 | Cooperman |
| 2007/0112740 A1 | 5/2007 | Geva |
| 2008/0134048 A1 | 6/2008 | Geva |

OTHER PUBLICATIONS

G.P. Ellis, et at "Hibrowse for Hotels: Bridging the Gap Between User and System Views of a Database", 1990.

A. Steven, Pollitt, et al., "Hibrowse for bibiliographic databases", Journal of Information Science, 20(6) Jul. 1994.

Peleg M., 1999 "GEOBASE—Israel in time and space", Paper presented in the SCORUS 1998 Conf. Belfast, Jun. 1998.

Amin Vandat, et al., WebOS: Operating system services for wide area applications (1997), Proceedings of the 7th Symp. On High Performance Distributed Computing, 1997.

K. Takeda, et al. "Information Outlining and Site Outlining" 1997.

H.P. Kumar, et al., "Browsing hierarchical data with multi-level dynamic queries and pruning", Int. J. Human-Computer Studies (1997) 46, 103-124.

R. Godin, et al., "Design of a browsing interface for information retrieval", 1989.

R.A. Baeza-Yates, et al., "New approach to information management: Attribute-centric data systems", 2000.

R.B. Allen, et al., "Two digital library interfaces that exploit hierarchical structure", Jun. 1994.

G. Berry and Pierre-Louis Curien, Sequential algorithms on concrete data structures: Theoretical Computer Science 20:265-321 (1982).

G. Khan, et al., "Concrete domains", Theoretical Computer Science 121: 187-277 (May 1993).

Glynn Winskel, "Event Structures", Advances in Petri nets 1986, Springer Lecture Notes in Computer Science 255 (1987).

M. Morohashi, et al., "Information Outlining—Filing the Gap between Visualization and Navigation in Digital Libraries", 1995.

U.S. Appl. No. 60/729,111, filed Oct. 20, 2005.

U.S. Appl. No. 60/850,191, filed Oct. 20, 2006.

U.S. Appl. No. 60/168,659, filed Dec. 2, 1999.

Newest Mercado Release Provides E-Commerce Merchandisers with More Control, Better Insight, and Greater Impact on Business, http://www.findarticles.com/p/articles/mi_m0EIN/is_2005_August10/ai_n14889203, Aug. 10, 2005.

Internal e-mail correspondence of Mercado Software entitled, "CSN 3.5.0 version is ready (Aug. 1, 2005)".

R.B. Allen, "Retrieval from facet spaces", Electronic publishing, vol. 8(3), 247-257, Sep. 1996.

R.B. Allen "Navigation and searching in hierarchical digital library catalogs", Proceedings of the 1$^{st}$ Annual Conf. On the Theory and Practice of Digital Libraries, Jun. 19-21, 1994, Texas, USA.

G.M. Sacco, "Dynamic taxonomies: A model for large information bases", IEEE Trans. On Knowledge and Data Engineering, vol. 12, No. 3, May/Jun. 2000.

A. Steven Pollitt, et al., "View-based searching systems—progress towards effective disintermediation", Online Information 96 Proceedings, pp. 445, Dec. 3-5, 1996.

C. Carpineto, et al., "ULYSSES: A Lattice-based multiple interaction strategy retrieval interface", In /blumenthal. Gornostaev & Unger (Es.), Human-Computer Interaction, 5$^{th}$ Int. Conf. EWHCI'95, Moscow, Russia, Jul. 1995.

R.J. Miller, et al., "Integrating hierarchical navigation and querying" A user customizable solution, ACM multimedia workshop on effective abstractions in multimedia layout, presentation, and interaction, San Francisco, CA, Nov. 1995.

R.J. Miller, et al., "DataWeb: customizable database publishing for the web", Published in IEEE Multimedia, 4(4):14-21, Oct. 1997.

Marti A. Hearst, "Interfaces for searching the web", Scientific American, Mar. 1997.

R.A. Baeza-Yates, et al., "Modern Information Retrieval", Jan. 1999.

Susan E. Aldrich, Mercado CSN V.3.0 Product Search, Patricia Seybold Group, Feb. 24, 2005.

U.S. Appl. No. 60/860,633, filed Nov. 22, 2006.

IDS U.S. Appl. No. 11/497,219 Geva, filed Jul. 31, 2006.

\* cited by examiner

220: CREATE ATTRIBUTE awi FOR EVERY VALUE wi OF h, AND CREATE ROOT ATTRIBUTE ah

222: ASSIGN VALUE wj TO EACH awi, SUCH THAT wj IMMEDIATELY REFINES wi, AND ASSIGN TO ROOT ATTRIBUTE ah VALUES wj THAT DO NOT REFINE OTHER VALUES

224: CREATE ENABLING RELATIONSHIP awi:wj |− awj FOR EACH NEWLY CREATED ATTRIBUTE-VALUE PAIR awi:wj, AND CREATE ENABLING RELATIONSHIP ∅|− ah FOR THE ROOT ATTRIBUTE

228: REPLACE CHARACTERIZATION (h:wi AND h:wj) BY CHARACTERIZATION awi:wj

CONTROLLING PRESENTATION OF REFINEMENT OPTIONS IN ONLINE SEARCHES

CROSS-REFERENCES TO RELATED APPLICATIONS

The present application is a continuation of U.S. application Ser. No. 11/986,426, filed Nov. 21, 2007 now U.S. Pat. No. 7,930,313, which claims the benefit of U.S. Provisional Application 60/860,633, filed Nov. 22, 2006, entitled, "Techniques for controlling presentation of refinement options in online searches," which is assigned to the assignee of the present application and is incorporated herein by reference.

FIELD OF THE INVENTION

The present invention relates generally to online search engines, and specifically to techniques for presenting refinement options for queries.

BACKGROUND OF THE INVENTION

Some online search and navigation systems use attribute-value pairs to characterize a collection of items. Such systems allow a user to select values for one or more attributes, and return the subset of the items characterized by the selected values. In order to permit the user to further refine his search, these systems present additional values that characterize at least a portion of the returned subset. This iterative process allows the user to arrive at a desired subset of items via multiple search and refinement paths.

The following references, which are incorporated herein by reference, may be of interest:
G. Kahn and G. Plotkin, "Concrete domains," Theoretical Computer Science 121:187-277 (1993)
G. Berry and Pierre-Louis Curien, "Sequential algorithms on concrete data structures," Theoretical Computer Science 20:265-321 (1982)
Glynn Winskel, "Event structures," Advances in Petri nets 1986, Springer Lecture Notes in Computer Science 255 (1987)

SUMMARY OF THE INVENTION

In embodiments of the present invention, a search and navigation system uses enabling relationships to determine which refinement options to present to a user in conjunction with presenting a result set of a user query specified by one or more attribute-value pairs or other elements, such as free search. Each of the enabling relationships maps a set of attribute-value pairs to an attribute. When the query or current state includes the set of attribute-value pairs of a given enabling relationship, the system presents the user with the attribute of the enabling relationship together with one or more values of the enabled attribute. The user's selection of one of the presented values adds the corresponding attribute-value pair to the query, thereby refining the search.

In general, these techniques suppress presentation, as refinement options, of a portion of the attribute-value pairs that characterize at least one item in the result set. As a result of such suppression, the user is not presented with attribute-value pairs as refinement options that are not expected to be meaningful to the user in conjunction with the current search results. The use of these data-driven techniques obviates the need for numerous attribute-value presentation rules, which often must be individually coded when using techniques known in the art.

In addition, for some applications, the enabling relationships help provide a meaningful presentation to the user of refinement options. For example, refinement options that are indirectly enabled may be presented in a nested structure in association with the refinement options that enable them.

There is therefore provided, in accordance with an embodiment of the present invention, a computer-implemented method for use with a corpus of items, the method including:
specifying one or more enabling relationships, which map enabling sets of one or more enabling attribute-value pairs to respective enableable attributes;
receiving a search query from a user;
responsively to the search query, designating a current state that includes one or more current-state attribute-value pairs, and generating a result set containing one or more of the items of the corpus;
identifying that an enableable attribute of one of the enabling relationships is enabled when the current-state attribute-value pairs include all of the enabling attribute-value pairs of the one of the enabling relationships;
finding a populated attribute-value pair that includes the enabled attribute and a value therefor, and which, when added to the search query, results in an extended query that is satisfied by at least one of the items in the corpus; and
presenting the result set in association with the value of the populated attribute-value pair, as a refinement option for selection by the user in order to refine the search query.

Typically, identifying that the enableable attribute is enabled includes identifying that the current-state attribute-value pairs do not include the enableable attribute.

For some applications, the search query includes one or more search query attribute-value pairs, and the current-state attribute-value pairs consist of the search query attribute-value pairs. Alternatively, the search query includes one or more search query attribute-value pairs, and the current-state attribute-value pairs consist of a set selected from the group consisting of: a subset of the search query attribute-value pairs, and a superset of the search query attribute-value pairs.

For some applications, the method further includes:
receiving, from the user, an indication of a selection of the refinement option;
responsively to the indication, generating a refined search query by adding the populated attribute-value pair to the search query; and
responsively to the refined search query, generating a refined result set, and presenting the refined result set to the user.

Optionally, specifying the enabling relationships includes dynamically creating or modifying at least one of the enabling relationships based on a conditional rule.

In an embodiment of the present invention, presenting the result set includes:
generating at least one extended state that includes the current state and the populated attribute-value pair;
identifying a sub-enabled attribute that is an enableable attribute of one of the enabling relationships enabled by the extended state because the extended-state attribute-value pairs include all of the enabling attribute-value pairs of the one of the enabling relationships;
responsively to a sub-search query including the search query and the populated attribute-value pair, generating a sub-result set containing one or more of the items of the corpus;

finding a populated extended-state attribute-value pair that includes the sub-enabled attribute and a value therefor, and which, when added to the sub-search query, results in an extended sub-search query that is satisfied by at least one of the items in the corpus; and presenting the result set in association with the value of the populated attribute-value pair and the value of the populated extended-state attribute-value pair.

In an embodiment of the present invention, specifying the one or more enabling relationships includes specifying a plurality of enabling relationships by:

specifying a hierarchical attribute having a plurality of values and a refinement relation over the values; and transforming the hierarchical attribute into the plurality of enabling relationships in accordance with the refinement relation.

For some applications, the a plurality of values of the hierarchical relationship are denoted by $w_n$, the refinement relation is denoted by $w_i <_h w_j$, and transforming the hierarchical attribute into the plurality of enabling relationships includes:

creating respective attributes awi for values $w_i$ of the hierarchical attribute;

assigning, to each of the attributes awi, a value wj that immediately refines $w_i$, to create respective attribute-value pairs awi:wj; and for each of the attribute-value pairs awi:wj, creating an enabling relationship including the attribute-value pair awi:wj and an enableable attribute awj.

For some applications, specifying the hierarchical attribute includes characterizing at least one of the items in the corpus by h:wi and h:wj, wherein $w_j$ immediately refines $w_i$, and transforming the hierarchical attribute includes recharacterizing the at least one of the items by the attribute-value pair awi:wj.

Typically, finding the populated attribute-value pair includes finding that the populated attribute-value pair characterizes at least one of the items in the result set.

There is further provided, in accordance with an embodiment of the present invention, apparatus for use with a corpus of items, the apparatus including:

an interface; and a refinement processor, which is configured to receive, via the interface, a search query from a user, to generate, responsively to the search query, a result set containing one or more of the items of the corpus, to receive a specification of one or more enabling relationships, which map enabling sets of one or more enabling attribute-value pairs to respective enableable attributes, to designate, responsively to the search query, a current state that includes one or more current-state attribute-value pairs, to identify that an enableable attribute of one of the enabling relationships is enabled when the current-state attribute-value pairs include all of the enabling attribute-value pairs of the one of the enabling relationships, to find a populated attribute-value pair that includes the enabled attribute and a value therefor, and which, when added to the search query, results in an extended query that is satisfied by at least one of the items in the corpus, and to present, via the interface, the result set in association with the value of the populated attribute-value pair, as a refinement option for selection by the user in order to refine the search query.

There is still further provided, in accordance with an embodiment of the present invention, a computer software product for use with a set of items each of which is characterized by one or more attribute-value pairs, the product including a computer-readable medium in which program instructions are stored, which instructions, when read by a computer, cause the computer to receive a search query from a user, to generate, responsively to the search query, a result set containing one or more of the items of the corpus, to receive a specification of one or more enabling relationships, which map enabling sets of one or more enabling attribute-value pairs to respective enableable attributes, to designate, responsively to the search query, a current state that includes one or more current-state attribute-value pairs, to identify that an enableable attribute of one of the enabling relationships is enabled when the current-state attribute-value pairs include all of the enabling attribute-value pairs of the one of the enabling relationships, to find a populated attribute-value pair that includes the enabled attribute and a value therefor, and which, when added to the search query, results in an extended query that is satisfied by at least one of the items in the corpus, and to present the result set in association with the value of the populated attribute-value pair, as a refinement option for selection by the user in order to refine the search query.

The present invention will be more fully understood from the following detailed description of embodiments thereof, taken together with the drawings, in which:

DETAILED DESCRIPTION OF EMBODIMENTS

Figure 1:
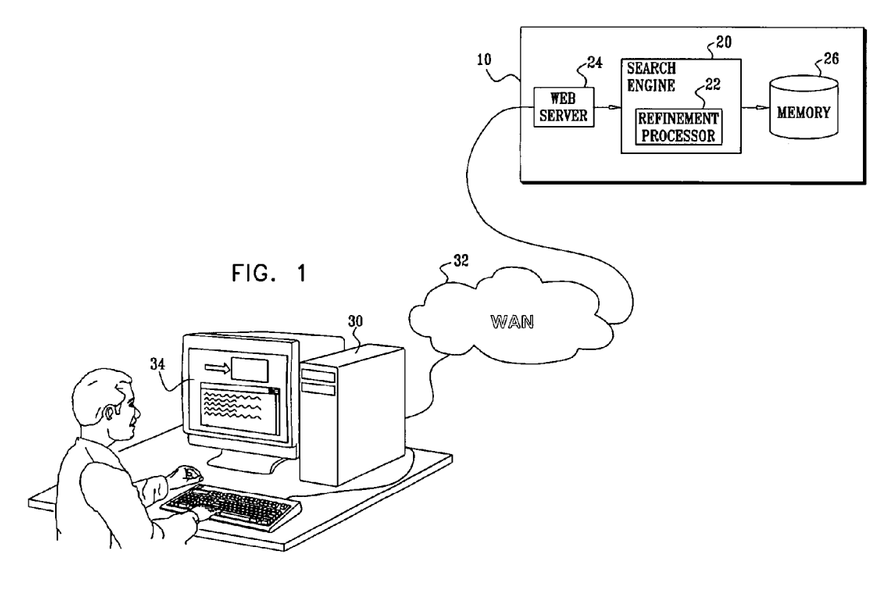
FIG. 1 is a schematic illustration of a search and navigation system 10, in accordance with an embodiment of the present invention.

FIG. 1 is a schematic illustration of a search and navigation system 10, in accordance with an embodiment of the present invention. System 10 comprises a search engine 20, an interface, such as a web server 24, and a memory 26. Search engine 20 comprises a refinement processor 22, described in detail hereinbelow. System 10 provides searching and navigation of a set of items stored in memory 26. Typically, system 10 comprises one or more standard computer servers with appropriate memory, communication interfaces and software for carrying out the functions prescribed by the present invention. This software may be downloaded to the system in electronic form over a network, for example, or it may alternatively be supplied on tangible media, such as CD-ROM.

A user, such as a customer, uses a workstation 30, such as a personal computer, to remotely access system 10 via a wide-area network (WAN) 32, such as the Internet, and/or via a local area network (LAN). Typically, a web browser 34 of workstation 30 communicates with web server 24. The web browser facilitates entry of search queries, and displays search results. Alternatively, all or a portion of system 10 runs locally on workstation 30.

Memory 26, or another element of system 10, contains at least one index or data structure that associates characteristics with items in the memory. The characteristics are expressed as one or more attribute-value pairs (notated herein as a:v), each of which pairs specifies an attribute and a value of the attribute. A portion of the attributes may be ordered, i.e., have a fully ordered domain of values, such as price or date. As used in the present application, including in the claims, the phrase "attribute-value pair" means both an attribute-value pair in which the attribute has a single value, or an attribute-value pair in which the attribute has an ordered range of values. Similarly, the phrase "attribute value" means both a single value, or a range of ordered values.

Memory 26 contains one or more data structures including items and attribute-value pairs that characterize the items. For example, the data structures may include one or more indices or tables having entries, each of which includes an attribute-value pair and an associated item. The tables may be stored in a multi-dimensional array, a linked list, a link list of arrays, or another appropriate data structure known in the art. Alternatively or additionally, memory 26 may comprise one or more databases, such as relational databases. Memory 26 may be part of system 10 (such as part of one or more of search engine 20 and/or refinement processor 22), or may be distributed in other physical locations.

Memory 26, or another element of system 10, additionally contains at least one data structure that stores one or more enabling relationships, each of which maps a set of zero or more attribute-value pairs to an attribute enabled by the set of attribute-value pairs.

These relationships are notated herein as:

$$s \vdash a$$

wherein s is a set of attribute-value pairs that enables attribute a. Sets s that contain only a single attribute-value pair may be notated as:

$$a1:v1 \vdash a$$

If s is the null set Ø, the relationship is expressed as:

$$\emptyset \vdash a$$

Typically, the enabling relationships are created during an indexing procedure, which is performed manually by a manager of system 10, automatically by system 10, or a combination of manually and automatically. For some applications, one or more of the enabling relationships are dynamically created, modified, or triggered based on conditional rules. These rules may be applied, for example, to the query and/or the result set, and/or may be specified by a schedule.

Figure 2:
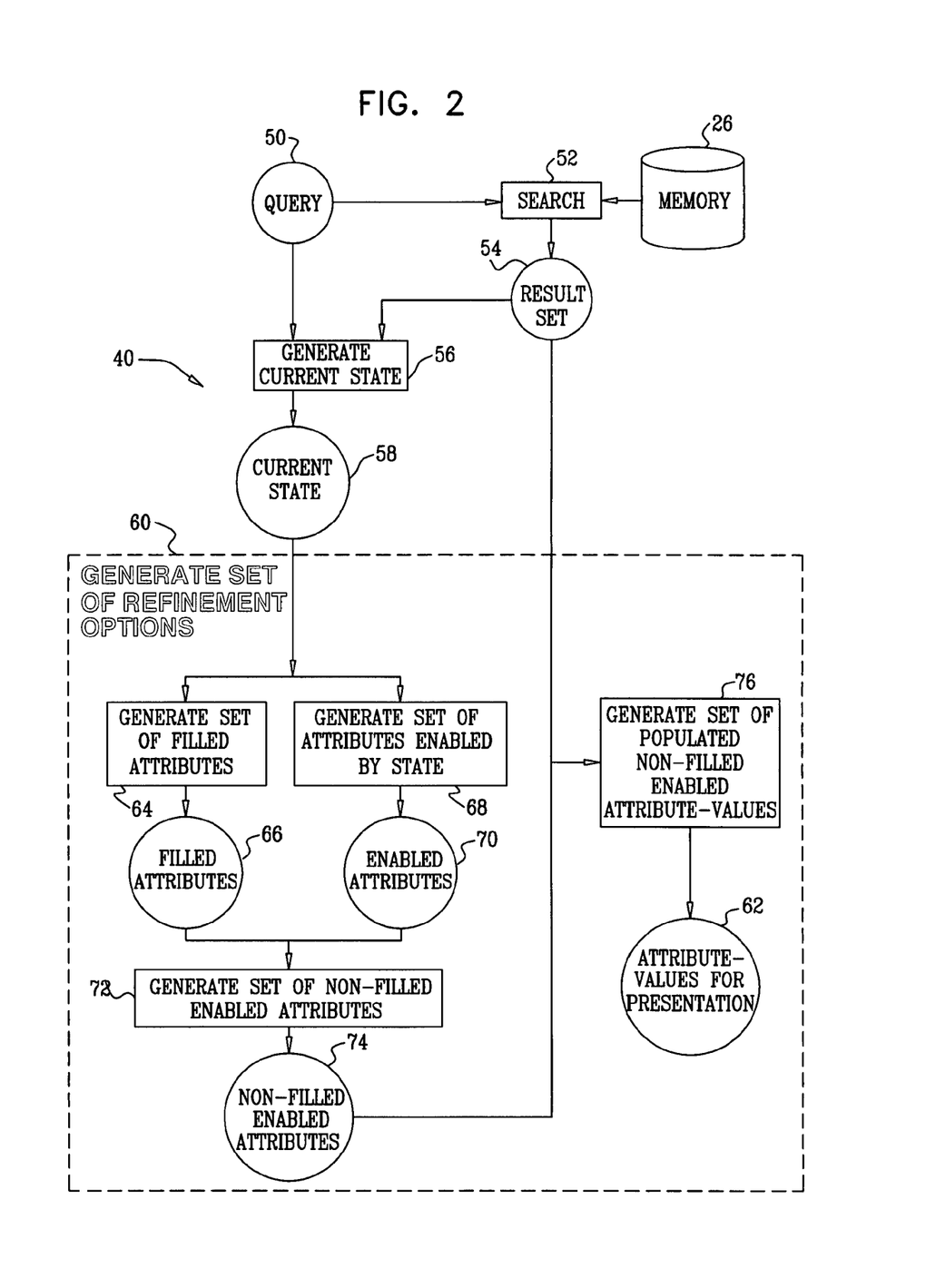
FIG. 2 is a flow chart that schematically illustrates a method for generating a set of refinement options for presentation to a user, in accordance with an embodiment of the present invention.

Reference is made to FIG. 2, which is a flow chart that schematically illustrates a method 40 for generating a set of refinement options for presentation to a user, in accordance with an embodiment of the present invention. Method 40 begins by receiving as input a query 50, which is specified by a set of zero, one, or more attribute-value pairs. The query may also include additional elements, such as a free text search, and various configuration options. Typically, such additional elements are represented as attribute-value pairs that may participate with the enablement of attributes, with the proviso that they do not necessarily directly characterize items in memory 26.

At a search step 52, search engine 20 (FIG. 1) searches query 50 against the set of items memory 26, and outputs a result set 54 containing zero or more items from memory 26. Techniques for generating search results are well known to those skilled in the art.

At a current state generation step 56, refinement processor 22 designates a current state 58 at least in part based on the search query, which current state is characterized by zero, one, or more attribute-value pairs. For some applications, the current state is equivalent to query 50, while for other applications, the current state is a subset or a superset of query 50. For some applications, generating the current state comprises finding a characterizing state for result set 54, which is a superset or subset of the state represented by query 50. In an embodiment, the characterizing state is found by projecting the retrieved items onto their characterizing attribute-value pairs, and selecting attribute-value pairs that cover more than a threshold percentage of the results, and/or have maximal coverage (among other attribute-value pairs for the same attribute). For some applications, such characterization is performed using techniques described in U.S. patent application Ser. No. 11/497,219, filed Jul. 31, 2006, entitled, "Result-based triggering for presentation of online content," which is assigned to the assignee of the present application and is incorporated herein by reference.

At a refinement option generation step 60, refinement processor 22 (FIG. 1) generates a set 62 of attribute-value pairs for presentation to the user as refinement options. Selection of at least one of these attribute-value pairs causes it to be added to query 50, i.e., to narrow current query 50 and corresponding result set 54. In other words, selection of at least one of the attribute-value pairs causes a transition (typically, a direct transition) between current state 58 and a second state additionally limited by the additionally selected attribute-value pair. For applications in which the user interface is a web browser, the attribute-value pair, or just the value of the attribute-value pair, is typically displayed as a hyperlink, which the user selects by clicking. Alternatively, a separate icon is provided nearby for selection. Typically, system 10 provides the manager of the system with the option of whether to display both attribute names and associated value(s), or just the value(s). For some applications, this decision is configurable separately for each attribute, for certain types of attributes, and/or based on the position on the screen at which a given attribute-value pair is displayed. Optionally, the attributes and/or values are stored as ID values, which are mapped to display strings.

In order to generate the refinement options, refinement processor 22 generates a set 66 of filled attributes, i.e., attributes for which current state 58 already includes an attribute-value pair, at a filled attribute generation step 64. There is no reason to offer such attributes as refinement options, because additional values associated with these attributes cannot further refine the search. They are thus eliminated from the set of refinement options, as described hereinbelow at step 72. (An exception is a non-exclusive attribute, for which a single item may be characterized by multiple values. Such attributes are not necessarily entered into the set of filled items 66, if it is desired to present these attributes in order to allow for multiple refinements of the same attribute.)

At an enabled attribute generation step 68, refinement processor 22 generates a set 70 of attributes enabled by current state 58. Using the notation described hereinabove, an attribute a is enabled by the current state S if and only if there is a subset s of current state S which subset s enables a, s |- a, as specified by the enabling relationships stored in memory 26. In other words, an attribute a is enabled by the current state S if and only if the attribute-value pairs of the current state S comprise the set of one or more enabling attribute-value pairs that is mapped to attribute a by at least one of the enabling relationships. An attribute which has the null set as an enabling set is enabled in every state.

Enabled attribute set 70 is thus found by testing whether s is contained in the current state S, for each enabling relationship s |- a and, if so, adding a to enabled attribute set 70.

At a non-filled enabled attribute generation step 72, refinement processor 22 generates a set 74 of non-filled enabled attributes, by taking enabled attribute set 70 and removing therefrom any attributes that are also in filled attribute set 66. Set 74 thus includes only attributes that are candidates for inclusion as refinement options.

Refinement processor 22 determines which values of the attributes in set 74 to include as refinement options, at a populated attribute generation step 76. An attribute-value pair is considered populated if the result set returned by searching the extended query obtained by extending query 50 by the attribute-value pair contains at least one result item, i.e., the result set includes at least one item that satisfies the extended query. Unpopulated attribute-value pairs are not presented since they lead to a dead-end (no search results) if added to the query. Typically, an attribute-value pair is populated when it characterizes at least one item in the result set 54. In this case, the populated values for an attribute are obtained by projecting the items in result set 54 onto the attribute-value pairs that characterize them, either directly using data structures in memory 26, or using cached results of previous computations, as will be clear to those skilled in the art. Because this projection may require resource-intensive computation, limiting the projection to set of attributes 74 helps to optimize performance of system 10. Optionally, this computation is additionally used to generate a count of items that map to each attribute-value pair, which may be displayed in the user interface to provide more information to the user, or may be used to establish dominant characteristics. Resulting attribute-value pair set 62 includes only attribute-value pairs that are populated, i.e., typically, that characterize at least one item in result set 54.

For some applications, refinement processor 22 further prunes the attributes at generation step 76, in order to present only the most important attributes. Such further pruning may be desirable in order to accommodate the availability of only limited screen area. For some applications, refinement processor 22 performs such further pruning by ordering the attributes and taking only the top attributes. For example, the ordering may be based on heuristics that rank attributes by their importance and usefulness by such criteria as coverage of items, discrimination power, and distribution between different values for the attribute. This ranking may subject to the application of rules that may implement business requirements, such as "place the attribute Brand second, when in the Watches department."

In general, the techniques of method 40 suppress a portion of attribute-value pairs from presentation which characterize at least one item in result set 54, and which would thus otherwise be presented to the user as refinement options. This suppressed portion includes those attribute-value pairs which characterize at least one item in result set 54, but which are not enabled by current state 58 pursuant to the enablement relationships stored in memory 26.

It is noted that the steps of method 40 may be re-ordered, or performed essentially in parallel, such as to optimize performance of the method. For example, step 68 is not necessarily performed before step 72. For some applications, these steps are performed essentially in parallel, or step 72 is performed before step 68.

Figure 3A:
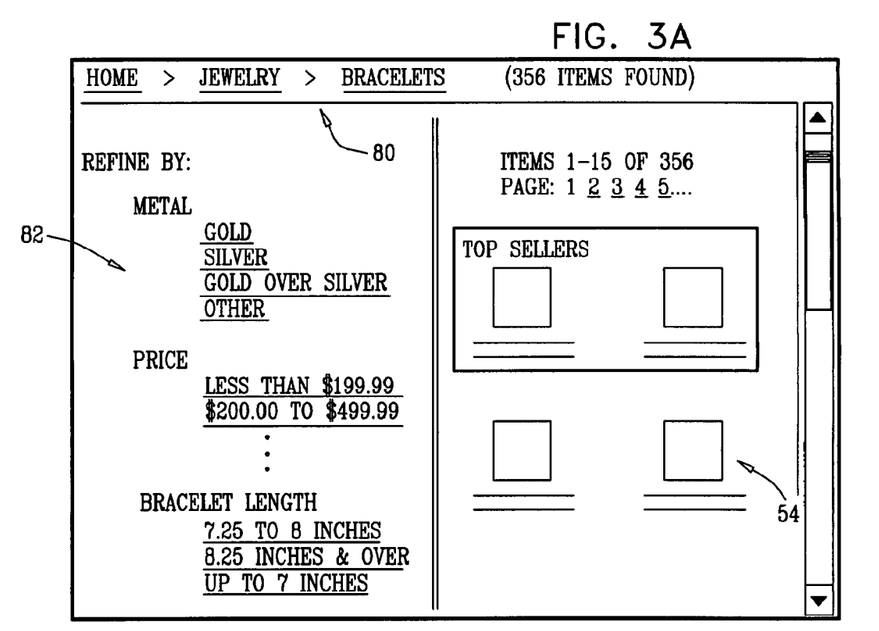
FIGS. 3A-C are schematic illustrations of respective exemplary portions of screens from a user interface, in accordance with an embodiment of the present invention.
Figure 3B:
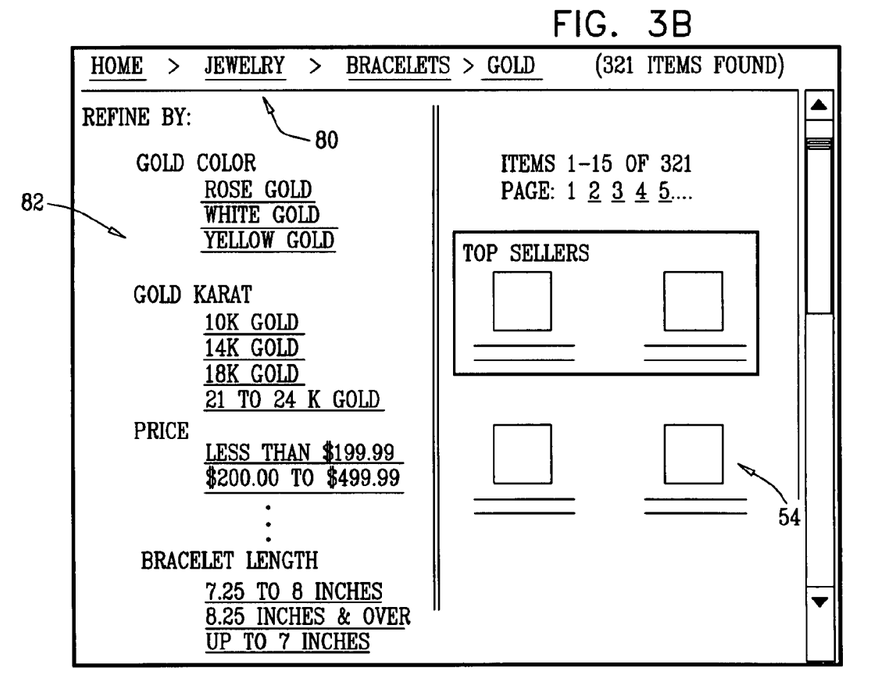
Figure 3C:
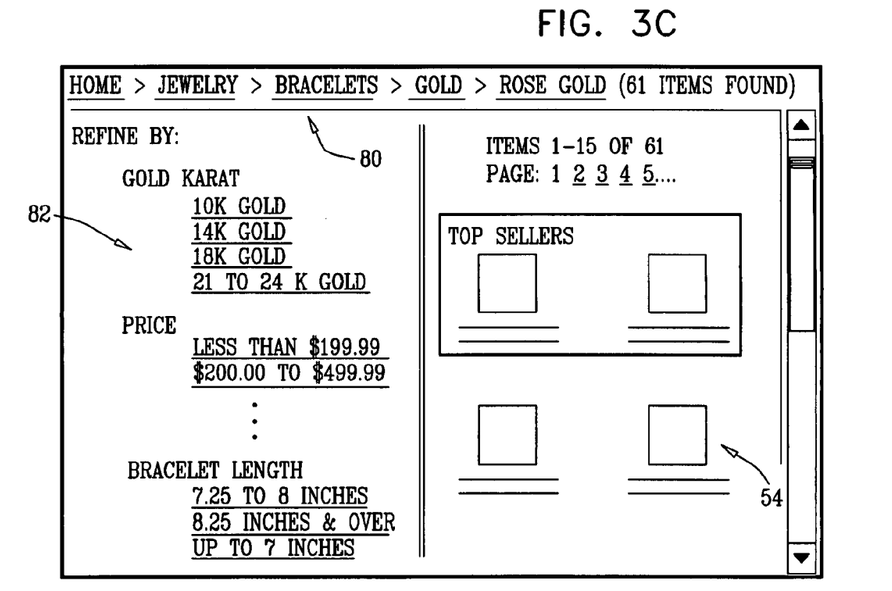

Reference is made to FIGS. 3A-C, which are schematic illustrations of respective exemplary portions of screens from a user interface, in accordance with an embodiment of the present invention. These exemplary screens are from an exemplary online store, displayed by search engine 20 in web browser 34 (FIG. 1). The generation of these screens by system 10 is described in the following paragraphs with reference to the steps and reference numbers of method 40, described hereinabove with reference to FIG. 2.

Each of the items stored in memory 26 is characterized by at least one of the attributes/values shown in Table 1. It will be appreciated that actual implementations of the embodiments described herein generally include more attributes and values than illustrated in this example. Some of the entries in Table 1 are only used herein in the embodiments described hereinbelow with reference to FIGS. 4 and 5A-B.

TABLE 1

| Attribute | Values |
| --- | --- |
| Department | Jewelry |
|  | Watches |
|  | House&Home |
| Jewelry_Category | Bracelets |
|  | Rings |
|  | Earrings |
|  | Necklaces |
| Watches_Category | Men's |
|  | Women's |
|  | Unisex |
|  | Fashion |
| House&Home_Category | Furniture |
|  | Rugs |
|  | Bath |
| Metal | Gold |
|  | Silver |
|  | Gold_over_silver |
|  | Other |
| Price | Less than $199.99 |
|  | $200.00 to $499.99 |
| Bracelet_Length | 7.25 to 8 inches |
|  | 8.52 inches and over |
|  | up to 7 inches |
| Gold_Color | Rose_gold |
|  | White_gold |
|  | Yellow_gold |
| Gold_Karat | 10_karat_gold |
|  | 14_karat_gold |
|  | 18_karat_gold |
|  | 21_to_24_karat_gold |

The exemplary online store includes at least the enabling relationships shown in Table 2. Again, it will be appreciated that actual implementations of the embodiments described herein generally include more enabling relationships than illustrated in this example.

TABLE 2

| No. | Enabling relationship |
| --- | --- |
| 1 | ø |- Department |
| 2 | Department:Jewelry |- Jewelry_Category |
| 3 | ø |- Price |
| 4 | Department:Jewelry |- Metal |
| 5 | Jewelry_Category:Bracelets |- Bracelet_Length |
| 6 | Metal:Gold |- Gold_Color |

TABLE 2-continued

| No. | Enabling relationship |
|---|---|
| 7 | Metal:Gold \|- Gold_Karat |
| 8 | Department:Watches \|- Watches_Category |
| 9 | Department:House&Home \|- House&Home_Category |

As can be seen by a breadcrumb 80, the user arrived at the screen shown in FIG. 3A after selecting Jewelry and then Bracelets. Prior to generating the screen shown in FIG. 3A, system 10 received query 50 (FIG. 2) that included the attribute-value pairs Department:Jewelry and Jewelry_Category:Bracelets. Search engine 20 searched query 50 against memory 26, and outputted result set 54, a portion of which is shown in the screen of FIG. 3A.

In order to determine which refinement options 82 to present, refinement processor 22 generates set 66 of filled attributes, i.e., attributes for which current state 58 includes an attribute-value pair, at filled attribute generation step 64. Set 66 includes Department (because this attribute is filled by value Jewelry) and Jewelry_Category (because this attribute is filled by value Bracelets). These attributes and values are not included in refinement options 82 (although transitions with respect to these attributes and/or values may be possible via breadcrumb 80, or other means).

At enabled attribute generation step 68, refinement processor 22 generates set 70 of attributes enabled by current state 58. Because query 50 includes the attribute-value pairs specified in enabling relationships nos. 1-5 in Table 2, the corresponding attributes are enabled (Department, Jewelry_Category, Price, Metal, and Bracelet_Length). (It is noted that the set of enabling attribute-value pairs in enabling relationship nos. 1 and 3 is the null set, so that attributes Department and Price are always enabled.) However, because query 50 does not include the attribute-value pair specified in enabling relationships nos. 6-9 (Metal:Gold in nos. 6 and 7, and Department:Watches and Department:House&Home in nos. 8 and 9, respectively), the corresponding attributes are not enabled (Gold_Color, Gold_Karat, Watches_Category, House&Home_Category).

Of particular significance, the attributes specified in enabling relationships nos. 6 and 7 (Gold_Color and Gold_Karat) are not enabled even though each of these attribute characterizes at least one item in result set 54.

At non-filled enabled attribute generation step 72, refinement processor generates set 74 of non-filled enabled attributes, by taking the set of enabled attributes (Department, Jewelry_Category, Price, Metal, and Bracelet_Length), and removing therefrom the filled attributes in set 66 (Department and Jewelry_Category). Set 74 thus contains Price, Metal, and Bracelet_Length.

At populated attribute generation step 76, refinement processor 22 determines which values of the attributes in set 74 should be presented in the refinement options 82. Attributes which have populated values in result set 54 are included. For example, the values Gold, Silver, Gold over Silver, and Other are displayed for the attribute Metal.

Continuing the example shown in FIG. 3A, the user selects the value Gold for the attribute Metal, causing a direct transition to the state illustrated in FIG. 3B. This selection adds the attribute-value pair Metal:Gold to query 50, thereby refining the query, and thus result set 54. This has the following effects:

enabling relationships nos. 6 and 7 (Table 2) are triggered, thereby additionally enabling attributes Gold_Color and Gold_Karat, and adding them to set 70 (at step 68);

attribute Metal is filled by value Gold, thereby adding attribute Metal to filled attribute set 66 (at step 64);

as a result of the previous two effects, attributes Gold_Color and Gold_Karat are added to non-filled enabled attribute set 74, and attribute Metal is removed from set 74 (at step 72); and refinement options 82 are updated accordingly, at step 76.

The user selects the value Rose_gold for attribute Gold_Color, causing a direct transition to the state illustrated in FIG. 3C. The addition of attribute-value pair Gold_Color:Rose_gold to query 50 causes the removal of Gold_Color and its values from refinement options 82, but, significantly, does not cause the removal of the attribute of Gold_Karat and its values from refinement options 82 (so long as this attribute is not removed for other considerations, e.g., if this attribute is unpopulated in the new result set).

As mentioned above, set s of an enabling relationship may contain more than one attribute-value pair. For example, an enabling relationship may be specified by:

{a1:v1, a2:v2} |- a3 wherein current state 58 must include both specified attribute-value pairs in order to trigger the inclusion of attribute a3 in the refinement options.

For example, the attribute Gold_bracelet_chain (or just chain) could be added to the store catalog, with values such as "fancy link" and "box link," with the following enabling relationship:

{Category:Bracelets, Metal:Gold} |- chain

This enabling relationship would reflect the fact that in the exemplary store only gold bracelets may have links, and "chain" is considered a minor attribute with respect to its enablers.

For some applications, when a set s of an enabling relationship contains more than one attribute-value pair, refinement processor 22 evaluates the attribute-value pairs using one or more logical AND operators. Alternatively, refinement processor 22 is configured to use more complex Boolean operations, such as a combination of AND, OR, and XOR operators, which may be grouped by parentheses. For some application, if more than one set s specifies the same enabled attribute, a separate enabling relationship is specified for each such set s. Alternatively, a single enabling relationship may specify a plurality of attributes enabled by a single set s. For some applications, one or more of the enabling relationships specifies an enableable attribute-value pair, rather than an enableable attribute.

Figure 4:
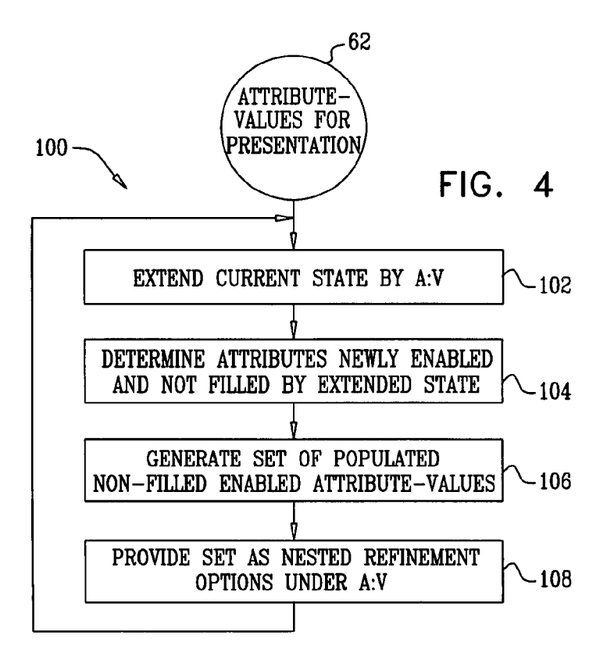
FIG. 4 is a flow chart that schematically illustrates a method for generating attribute-value pairs for presentation to a user as sub-refinement options, in accordance with an embodiment of the present invention.

Reference is made to FIG. 4, which is a flow chart that schematically illustrates a method 100 for generating attribute-value pairs for presentation to a user as sub-refinement options, in accordance with an embodiment of the present invention. Method 100 is used to enhance the presentation of the refinement options generated using method 40, described hereinabove with reference to FIG. 2, by including appropriate sub-refinement options, as described hereinbelow.

The enabling relations described hereinabove guide the presentation of sub-refinement options. Sub-attributes are attributes that may not be directly enabled in the current state, but may become enabled following selection by the user of a certain refinement from the current state, and thus may be presented to the user as a shortcut for performing two refinements at once. Typically, sub-refinement options are presented to the user in a nested structure, such as in a tree structure, under the immediate refinement option the selection of which would enable such sub-refinement options.

Typically, the selection of a value of a sub-refinement option by the user imposes the selected sub-refinement, as well as its enabling refinements.

Method 100 begins by receiving as input attribute-value pair set 62, which is generated at step 76 of method 40, as described hereinabove with reference to FIG. 2. The following steps 102-108 are performed for each attribute-value pair a:v of attribute-value pair set 62.

At a state extension step 102, refinement processor extends current state 58 by adding attribute-value pair a:v to the set of attribute-value pairs already in the current state, to generate an extended state. This extended state represents the state that would result if the user were to select attribute-value pair a:v from the refinement options currently displayed for current state 58. The refinement processor generates a set of attributes that are both (a) newly enabled by the addition of a:v to the state, as described hereinabove at step 68 of method 40, and (b) not filled by the extended state, as described hereinabove at step 64 of method 40, at an attribute determination step 104.

At an attribute-value generation step 106, refinement processor 22 generates a set of all the values for these newly-enabled attributes that are populated in a sub-result set generated responsively to a sub-search comprising query 50 and attribute-value pair a:v, using techniques described hereinabove at step 76 of method 40. This set represents a set of sub-refinement options for attribute-value pair a:v. As mentioned above, steps 102-108 are repeated for each attribute-value pair a:v of attribute-value pair set 62.

Search engine 20 drives the user interface, e.g., web browser 34 (FIG. 1) to display the resulting sets of sub-refinement options in visual association with their respective parent attribute-value pairs a:v.

Figure 5A:
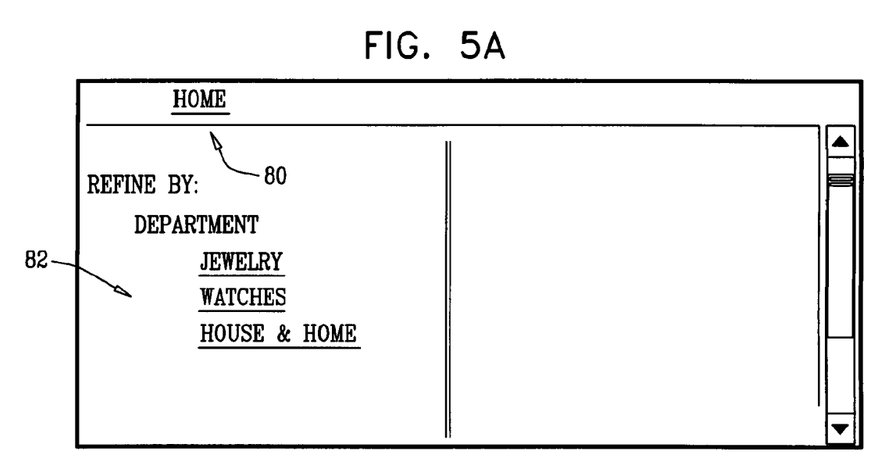
FIGS. 5A-B are schematic illustrations of respective exemplary portions of screens from a user interface, in accordance with respective embodiments of the present invention.
Figure 5B:
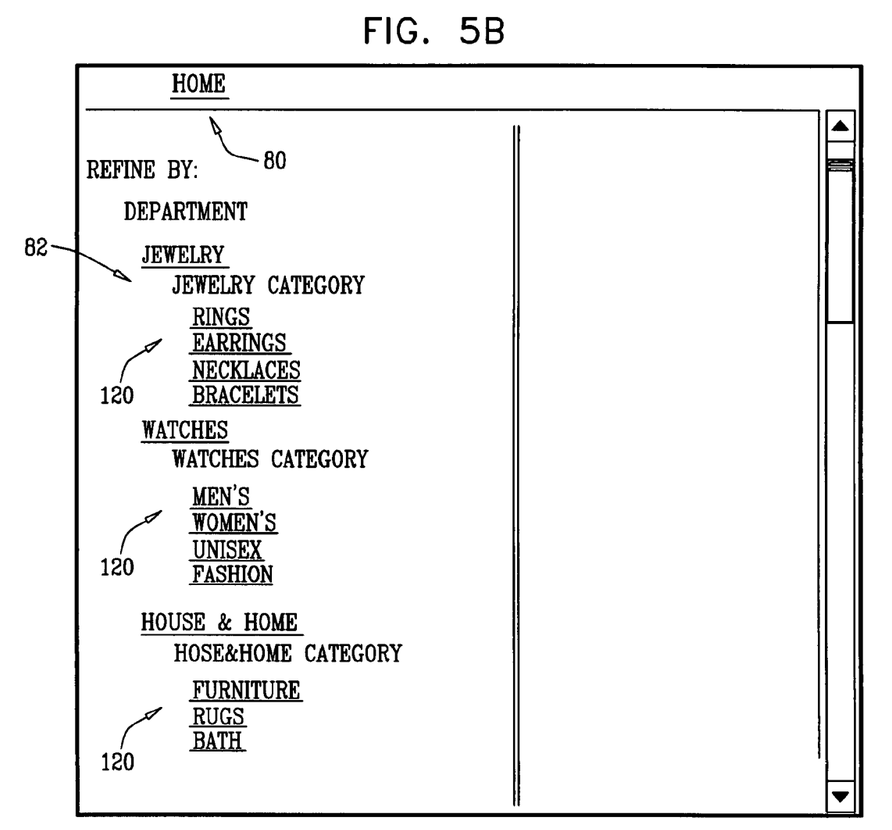

Reference is made to FIGS. 5A-B, which are schematic illustrations of respective exemplary portions of screens from a user interface, in accordance with respective embodiments of the present invention. The examples illustrated by these screens use the exemplary store described hereinabove with reference to FIGS. 3A-C.

FIG. 5A shows the results of method 40 before application of the sub-refinement option generation techniques of method 100, described hereinabove with reference to FIG. 4. The screen shows an initial home state, in which query 50 (FIG. 2) includes the null set. Enabling relationship no. 1 of Table 2 hereinabove enables the attribute Department. Attribute-value pair set 62 includes the populated values of this attribute, Department:Jewelry, Department:Watches, and Department:House&Home, which are displayed as refinement options 82, as described hereinabove in method 40. As mentioned earlier, the names of the attributes (e.g., "Department") may or may not be displayed, as per the configuration of system 10.

FIG. 5B shows an exemplary portion of the screen of FIG. 5A after application of the sub-refinement option generation techniques of method 100, described hereinabove with reference to FIG. 4. At state extension step 100 of method, refinement processor 22 extends current state 58 by separately adding each of the attribute-value pairs in set 62 to the attribute-value pairs already in current state 58. In this example, the current state includes the null set of attribute-value pairs.

The refinement processor adds the attribute-value pair Department:Jewelry to current state 58. As a result, at attribute determination step 104 of method 100, the additional attribute Jewelry_Category is enabled by enabling relationship no. 2 of Table 2, as described hereinabove at step 68 of method 40. This attribute is not filled, as described hereinabove at step 64 of method 40.

At attribute-value generation step 106 of method 100, refinement processor 22 generates a set of all the populated values for these newly-enabled attributes, which, in this example, include Rings, Earrings, Necklaces, and Bracelets. This set represents a set of sub-refinement options 120 for attribute-value pair Department:Jewelry. The name of the attribute (Jewelry_Category) is optionally displayed, as described hereinabove.

These sub-refinement generation steps are repeated for the balance of the populated members of set 62, Department:Watches and Department:House&Home.

In the screen shown in FIG. 5B, the sets of sub-refinement options 120 are presented as a tree under their respective parent attribute-value pairs. Alternative display arrangements will be evident to those skilled in the art who have read the present application, and are within the scope of this embodiment of the present invention.

For some applications, system 10 structures the sub-refinement options as nested XML, as shown in the following exemplary pseudo-XML:

```
<option att="dept" value="jewelry">
  <option att="jewelry_category" value="bracelets">
    <option att="bracelets_subcategory" value="engraved bracelets">
    </option>
  </option>
</option>
```

Alternatively, the system structures the sub-refinement options without nesting, using instead pointers to the parent, as shown in the following exemplary pseudo-XML:

```
<option att="dept" value="jewelry"></option>
<option att="jewelry_category" value="bracelets"
    parent_att="dept" parent_value="jewelry"></option>
<option att="bracelets_subcategory" value="engraved bracelets"
    parent_att="jewelry_category" parent_value="bracelets"></option>
```

Regardless of which display arrangement is used, direct selection by the user of a sub-refinement option typically accomplishes in a single step the equivalent selection of the associated parent attribute-value pair followed by selection of the sub-refinement option that would be presented in the next state. For instance, in the examples shown in FIG. 5B, selection of sub-refinement option Jewelry_Category:Bracelets adds both attribute-value pair Jewelry_Category:Bracelets and parent attribute-value pair Department:Jewelry to the next query issued, typically, in addition to constraints already present in query 50 and/or current state 58. The equivalent transition could also be performed by: (a) selecting parent attribute-value pair Department:Jewelry, which causes a transition to a new state further characterized by this attribute-value pair, in which attribute-value pair Jewelry_Category:Bracelets is shown as a refinement option, and (b) selecting attribute-value pair Jewelry_Category:Bracelets from this new state. In an alternative embodiment, selection of a sub-refinement option does not automatically cause selection of its parent attribute-value pair.

Method 100, as described hereinabove with reference to FIG. 4, carries out step 106 separately for each attribute-value pair a:v of attribute-value pair set 62. For optimizing this potentially costly step, in an embodiment of the present invention refinement processor 22 carries out the step simultaneously for all attribute-value pairs of set 62, including recursively nested levels as described hereinbelow, and together with the main populated attribute generation step 76 of method 60, described hereinabove with reference to FIG. 2.

For some applications, method 100, described hereinabove with reference to FIG. 4, is performed recursively, in order to generate multiple levels of nesting, which, for example, may be represented as a multi-level tree. If a first level extends the current state with a1:v1, then the second recursive level uses this extended state as its current state, and further extends with a newly enabled nested attribute a2:v2. The end-result is to have a2:v2 nested under a1:v1, with a recursive tree under a2:v2.

For some applications, method 100, described hereinabove with reference to FIG. 4, is performed, optionally recursively, by extending current state 62 with multiple attribute-value pairs of attribute-value pair set 62. This allows adding nested attributes that would be enabled by multiple refinement steps from the current state (subject to their being populated). Thus, if the current state is null and $\emptyset$ |- a1, $\emptyset$ |- a2, a nested attribute a3 may be allowed by {a1:v1, a2:v2} |- a3. The resulting nested structure is more general than a tree. In this example, refinement options for a3 could be presented under both a1:v1 and a2:v2, with an indication that selecting them would also impose a1:v1 and a2:v2.

In an embodiment of the present invention, a method is provided for optimizing search step 52 of method 40, described hereinabove with reference to FIG. 2, using nested depletion, as described hereinbelow. This method is applicable to attributes for which the item characterization in memory 26 "respects" the enabling relationships, as defined below. Such "respect" may be guaranteed by the construction and/or definition of the enabling relationships, or by actually testing the data.

Enabling relationships are said to be respected by the data in memory 26 for an attribute a if every item characterized by a (i.e., by some attribute-value pair a:v) is also characterized by some enabling set s for a, i.e., there is an s such that s |- a and all attribute-value pairs of s characterize the items. For example, using the enabling relationships, attributes, and values of the exemplary online store described hereinabove with reference to Tables 1 and 2, FIGS. 3A-C, and FIGS. 5A-B, the enabling is respected by the data for the attribute Metal if every item characterized by some value for Metal is also characterized by Department:Jewelry, because the enabling relationship Department:Jewelry |- Metal (no. 4 in Table 2) is the only enabling relationship for Metal. It is possible to construct data that does not respect the enabling relationships; the fact that the enabling relationships are not respected by the data may indicate a mismatch between the data and the enabling relationships. Alternatively, if enabling relationships are not respected for an attribute, this may indicate that the enabling relationships merely specify how to present the attribute in a nested fashion, and do not imply a causal relationship between the enabling relationships and the attribute.

If enabling relationships are respected for an attribute a and it is assumed that there is a single enabling relationship s |- a for a, then all items characterized by a are also characterized by the attribute-value pairs of s. Thus, if a query 50 (FIG. 2) (i) contains some constraint on a, such as a:v for some value v, and (ii) contains s (or some subset of s), then it is sufficient to include only the constraint a:v when performing search 52 of method 40. The constraints represented by s are automatically valid, i.e., the retrieved items, characterized by a:v as constrained, are necessarily characterized by all a:v pairs in s, even if elements of s are removed from the query.

(It is not necessary to require that a be enabled by a single enabling set s of attribute-value pairs. If the data respect enabling for a, and a is enabled by a plurality of enabling sets, attribute-value pairs $a_1:v_1$ common to all enabling sets of a can similarly be ignored by the search, and still will characterize all search results. Thus, as used herein, a "subsumes" an attribute-value pair $a_1:v_1$ whenever $a_1:v_1$ is an element of every enabling set of a.)

The method of the present embodiment uses nested depletion to find result set 56 for query 50 (FIG. 2) by:
removing from query 50 all attribute-value pairs a1:v1 that are transitively subsumed by some other attribute a that is filled in query 50 (that is, such that a:v is included in the query for some value v); and
performing the search using the resulting subset of the attribute-value pairs of query 50.

An attribute-value pair a1:v1 is transitively subsumed by an attribute a if either: (i) $a_1:v_1$ is an element of every enabling set of a, or (ii) a1:v1 is subsumed via a chain of direct subsumptions, e.g., $a_1:v_1$ is subsumed by $a_2$, and for some value $v_2$, $a_2:v_2$ is subsumed by a3, etc., until the last $a_n$ in the chain is a.

For example, consider the enabling relationships Department:Jewelry |- Metal and Metal:Gold |- Gold_color in the online store described above. Assume that the data is such that {enabling} is respected for attributes Metal and Gold_color. For these two enabling relationships, this means that, for the set of items in the online store, every item characterized by the Gold_color attribute (an item is characterized by an attribute a if the item is characterized by the attribute-value pair a:v for some value v of a) is also characterized by Metal:Gold, and every item characterized by the Metal attribute is also characterized by Department:Jewelry. Then, for the query {Department:Jewelry, Metal:Gold, Gold_color:Yellow_gold}, the Department:Jewelry and Metal:Gold constraints can be ignored when computing the results to the query, with no change to the results obtained, because each of the ignored attribute-value pairs is directly subsumed by an attribute filled in the query. Similarly, for the query {Department:Jewelry, Gold_color:Yellow_gold}, the attribute-value pair Department:Jewelry can be ignored, via two-step transitive subsumption.

In an embodiment of the present invention, a method is provided for optimizing the characterization of result set 54, using nested completion. This method enables at least partial characterization of result set 54 without actually examining the items in result set 54. Instead of examining items and their characteristics, this method uses the enabling relationships that are respected for the relevant attributes, as described hereinabove.

The nested completion is performed by adding to query 50 all attribute-value pairs transitively subsumed by an attribute in query 50. To obtain such transitive subsumption, directly subsumed attribute-value pairs are added iteratively, until no more are added.

For example, consider the enabling relationships Department:Jewelry |- Metal and Metal:Gold |- Gold_color in the online store described above. Assume that the data is such that enabling relationships are respected for attributes Metal and Gold_color. For these two enabling relationships, this means that, for the set of items in the online store, every item characterized by the Gold_color attribute is also characterized by Metal:Gold, and every item characterized by Metal attribute is also characterized by Department:Jewelry. For the query {Gold_color:Yellow_gold}, these relationships allow the system to deduce that the attribute-value pairs Department: Jewelry and Metal:Gold characterize all results for the query, using only the enabling relationships and the fact that the enabling relationships are respected for the attributes Gold_color and Metal.

Figure 6:
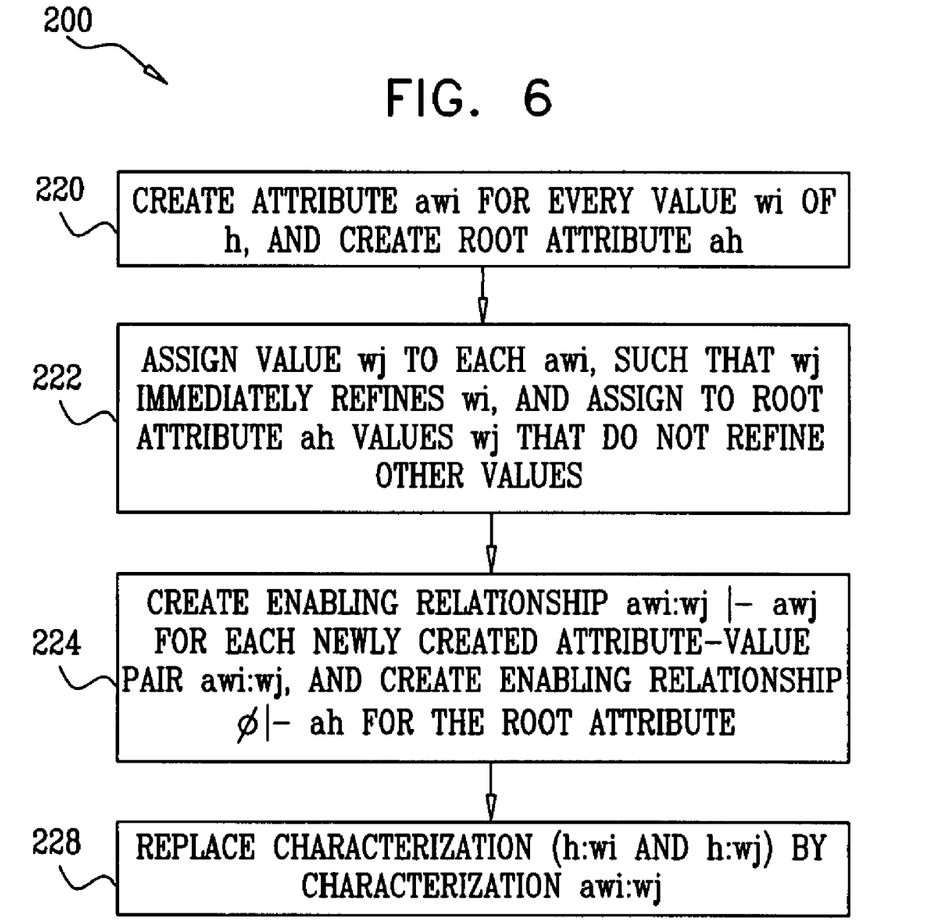
FIG. 6 is a flow chart that schematically illustrates a method for transforming a hierarchical attribute into a plurality of non-hierarchical attributes, in accordance with an embodiment of the present invention.
Figure 7A:
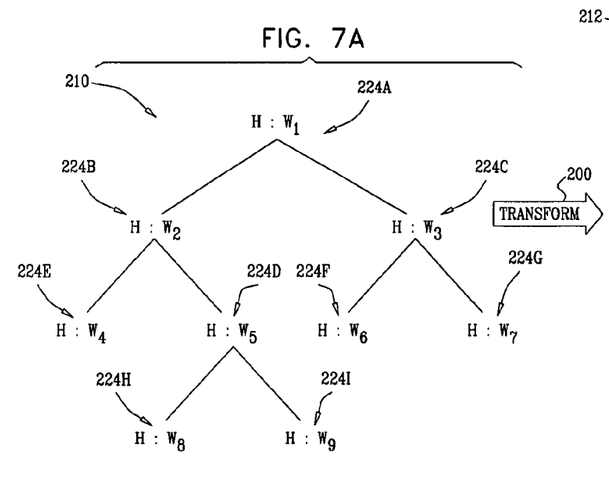
FIGS. 7A and 7B are a schematic illustration of a hierarchical attribute and a transformation thereof into a set of non-hierarchical attributes with enabling relationships, respectively, in accordance with an embodiment of the present invention.
Figure 7B:
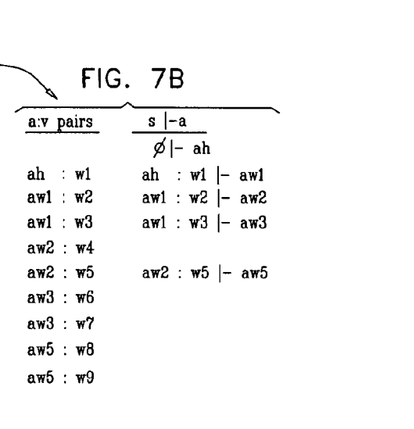

Reference is now made to FIG. 6, which is a flow chart that schematically illustrates a method 200 for transforming a hierarchical attribute into a plurality of non-hierarchical attributes, in accordance with an embodiment of the present invention. Reference is also made to FIGS. 7A and 7B, which are a schematic illustration of a hierarchical attribute 210 and a transformation thereof into a set 212 of non-hierarchical attributes with enabling relationships, respectively, in accordance with an embodiment of the present invention.

A hierarchical attribute h is an attribute having a refinement relation $<_h$ over its values. For $w_i$ and $w_j$ values of h, the expression $w_i <_h w_j$ signifies that $w_j$ refines $w_i$ according to the refinement relation of h. $w_j$ is said to immediately refine $w_i$ if $w_j$ refines $w_i$ and, in addition, there exists no value $w_k$ of h distinct from $w_j$ and $w_i$ such that $w_k$ refines $w_i$ and $w_j$ refines $w_k$. The refinement relation may take the form of a tree, such as shown in FIG. 7A, or, more generally, any directed acyclic graph (DAG).

Typically, the refinement relation is reflected in the relation between the sets of items characterized by the values of h. If $w_j$ refines $w_i$ then every item characterized by the attribute-value pair h:$w_j$ is also characterized by the attribute-value pair h:$w_i$, or, in other words, the set of items characterized by h:$w_j$ is a subset, and hence refines, the set of items characterized by h:$w_i$. In this case, it can be inferred that an item that is characterized by h:$w_j$ is also characterized by h:$w_i$.

For example, in an online store, the hierarchical attribute "Product_category" may be given a refinement relation in which the value "Men's watches" refines the value "Watches". Thus, every item characterized by the attribute-value pair Product_category:"Men's watches" is also characterized by Product_category:"Watches", that is, every men's watch is also a watch. There is no need to explicitly mark each men's watch as being a watch, since this can be inferred. Additionally, the men's watches category may be presented as a refinement option to the watches category.

Method 200 begins with the creation of an attribute awi for every value $w_i$ of attribute h, at an attribute creation step 220. At step 220, a root attribute $a_h$ is also created. At a value creation step 222, a value wj is assigned to each awi, such that $w_j$ immediately refines $w_i$, i.e., $w_i <_h w_j$, and there are no intervening $w_k$ such that $w_i <_h w_k$ and $w_k <_h w_j$. Root values $w_j$ (that do not refine any other value) are assigned to the root attribute $a_h$.

Each of the new attributes awi created at step 220 represents a decision among the immediate alternatives available at h:$w_i$, and the root attribute represents a decision among the root values. For example, the alternatives available for attribute-value pair h:$w_i$ in hierarchical attribute 210 of FIG. 7A are h:$w_2$ and h:$w_3$. In the transformation, as shown in FIG. 7B, these alternatives take the form of aw1:w2 and aw1:w3, i.e., the values w2 and w3 of attribute aw1.

It is sufficient to create awi for non-leaf values $w_i$ of the refinement relation, i.e., values that may be refined by other values, such as the values $w_1$, $w_2$, $w_3$, and $w_5$ in nodes 224A, 224B, 224C, and 224D, respectively, in hierarchical attribute 210. There are no possible values for awi for leaf nodes, such as leaf nodes 224E-I, because the values of the leaf nodes are not refined by any other values.

The method continues at an enabling relationship creation step 224, with the creation of an enabling relationship awi:wj |- awj for each attribute-value pair awi:wj created at steps 220 and 222. For example, the enabling relationship aw1: w2 |- aw2 is created for the attribute-value pair aw1:w2, shown in FIG. 7B. The root attribute is always enabled by the null set, i.e., ∅ |- $a_h$.

The attribute-value pairs created at steps 220 and 222 have no relationship, hierarchical or otherwise, except the relationship provided indirectly by the corresponding enabling relationship created at step 224.

For each item in memory 26 characterized by h:wi and h:wj (assuming $w_i$ is immediately $<_h w_j$), this hierarchical attribute characterization is replaced by the characterization awi:wj, at a recharacterization step 228. For example, an item characterized by h:$w_1$ and h:$w_2$ in hierarchical attribute 210 is recharacterized by aw1:w2 in set 212 of FIG. 7B. If an item is characterized by a root value h:wi then it is recharacterized by $a_h$:wi.

Refinement processor 22 uses the newly-created enabling relationships as described hereinabove. Thus, for example, if query 50 (FIG. 2) includes the attribute-value pair aw1:w2 (which corresponds to the hierarchical attribute-value pair h:$w_2$ in hierarchical attribute 210 prior to the transformation), the enabling relationship aw1:w2 |- aw2 (shown in set 212) causes refinement processor 22 to display attribute aw2 in association with its values w4 and w5, assuming aw2 is not already filled and at least one of the items in memory 26 is characterized by each of aw2:w4 and aw2:w5.

Typically, if h:wj characterizes an item and $w_i <_h w_j$, h:wi also characterizes the item, even if in some representations of hierarchical attributes this may be left implicit. Thus, awj subsumes awi:wj whenever $w_i <_h w_j$. As a result of this subsumption, for attributes obtained by applying this transformation, the nested depletion and nested completion techniques described hereinabove always may be used.

For example, using the online store described hereinabove, a hierarchical attribute named Product_category is shown in the Table 3.

TABLE 3

| Product_category value | Refinement relation |
|---|---|
| Jewelery | |
| Jewelry/Bracelets | Jewelry < Jewelry/Bracelets |
| Jewelry/Rings | Jewelry < Jewelry/Rings |
| Jewelry/Earrings | Jewelry < Jewelry/Earrings |
| Jewelry/Necklaces | Jewelry < Jewelry/Necklaces |
| Watches | |
| Watches/Men's | Watches < Watches/Men's |
| Watches/Women's | Watches < Watches/Women's |
| Watches/Unisex | Watches < Watches/Unisex |
| Watches/Fashion | Watches < Watches/Fashion |

Transformation of this hierarchical attribute, using method 200, described hereinabove with reference to FIGS. and 7A-B, results in the attributes, values and enabling relationships shown in Table 4.

TABLE 4

| Attribute | Assumes values | Enabling relationship |
|---|---|---|
| $a_{Product\_category}$ $a_{Jewelry}$ | Jewelry, Watches Jewelry/Bracelets Jewelry/Rings Jewelry/Earrings Jewelry/Necklaces | ∅ |- $a_{Product\_category}$ $a_{Product\_category}$:Jewelery |- $a_{Jewelry}$ |

TABLE 4-continued

| Attribute | Assumes values | Enabling relationship |
|---|---|---|
| $A_{Watches}$ | Watches/Men's Watches/Women's Watches/Unisex Watches/Fashion | $a_{Product\_category}$:Watches \|- $a_{Watches}$ |

In this example, an item originally characterized at Product_category:Watches/Fashion is recharacterized under $a_{Product\_category}$:Watches and $a_{watches}$:Watches/Fashion.

It is noted that the steps of method 200 may be re-ordered, or performed essentially in parallel, such as to optimize performance of the method.

While embodiments of the present invention have generally been described hereinabove in the context of attribute-value pairs characterizing items to be retrieved, queries consisting of such attribute value pairs, and enabling relationships that enable attributes, the present invention is not limited to this particular approach.

For example, in an embodiment of the present invention, instead of specifying enableable attributes, the enabling relationships specify enableable attribute-value pairs, such as:

Department:Jewelery |- Category:Bracelets
Department:Watches |- Category:Men's

The techniques described hereinabove may be used with such more specific enabling relationships.

Additionally, in an embodiment of the present invention, system 10 uses atomic terms, tags, or concepts, instead of or in addition to attribute-value pairs. Atomic terms, tags or concepts do not necessarily possess an internal structure (e.g., they cannot be cleanly mapped into differing values for an attribute). However, there may be a rich structure over the terms, tags or concepts, that may originate in linguistic knowledge (syntactic or semantic), in business considerations, or in various statistics. In all cases, an enabling relation between terms, tags and concepts may be used to structure the presentation of refinement options, using techniques similar to those described herein for attribute-value pairs.

For some applications, a further conflict relationship between refinement options (i.e., terms, tags, concepts, attributes, or attribute-value pairs) is added to prevent presentation of refinement options conflicting with previous selection(s) made by the user or implicitly by the system. Eliminating conflicting refinement options is an extension of eliminating filled attributes (such as at step 72 of method 40, described hereinabove with reference to FIG. 2), in which attribute-value pairs for the same attribute are deemed to conflict.

For example, system 10 may use the tags jewel, diamond, pearl, and lavishing, and the following enabling relationships:

Department:Jewelery |- jewel
jewel |- diamond
jewel |- pearl
jewel |- lavishing

Note the mixing of an attribute-value pairs and a tag (in the first enabling relationship), and the linguistic knowledge (a diamond is—a jewel). Additional knowledge may also be used in this way.

Furthermore, in an embodiment of the present invention, the query contains elements other than attribute-values pairs. For example, the query may contain an atomic tag or concept, as described above. In addition, system 10 may provide configuration options that control aspects of processing and presentation (for instance, how to sort the results). For some applications, a query may contain free-search constraints. Although such query elements are not necessarily represented as attribute-value pairs, and do not necessary characterize items in memory 26, such query elements may take part in controlling presentation, as components of the enabling sets that are compared with the current state and the query. Such query elements may even be enabled or not enabled, and presented in a nested fashion, based on enabling relationships specifications. For instance, a free-search for jewelry (or synonyms) may be specified to enable the Jewelry category, or the attribute-value pair Department:Jewelry may enable a configuration option that allows returning sale items at the top of the results.

The scope of the present invention includes embodiments described in the following applications, which are assigned to the assignee of the present application and are incorporated herein by reference. In an embodiment, techniques and apparatus described in one or more of the following applications are combined with techniques and apparatus described herein:

U.S. Provisional Application 60/729,111, filed Oct. 20, 2005, entitled, "Result-based triggering in search engine merchandising rules";

U.S. application Ser. No. 11/497,219, filed Jul. 31, 2006, entitled, "Result-based triggering for presentation of online content";

U.S. Provisional Application 60/850,191, filed Oct. 5, 2006, entitled, "Actionable reports"; and U.S. application Ser. No. 11/906,492, filed Oct. 1, 2007, entitled, "Actionable reports."

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A method for providing search query refinement options, comprising:
   storing, in a memory, a plurality of attributes and a plurality of values,
      wherein a plurality of attribute-value pairs each indicate a correspondence between at least one respective attribute and at least one respective value;
   storing, in the memory, a plurality of enabling relationships,
      wherein one or more of the plurality of enabling relationships indicate a respective attribute of the plurality of attributes enabled by a respective attribute-value pair;
   providing, one or more values for display from the plurality of values;
   receiving a selection of at least one of the one or more values provided for display;
   providing, in response to the selection, an updated one or more values for display wherein said providing the updated one or more values comprises:

identifying a current query state corresponding to the selected at least one of the one or more values provided for display;

identifying, based on the selected at least one of the one or more values provided for display, an attribute-value pair of the plurality of attribute-value pairs;

identifying, based on the identified attribute-value pair, an enabling relationship from the plurality of enabling relationships;

identifying, based on the identified enabling relationship, a set of attributes enabled by the current query state;

identifying a set of attributes filled for the current query state; and comparing the set of attributes enabled and the set of attributes filled to identify a set of non-filled enabled attributes, wherein the updated one or more values for display comprise the set of values corresponding to the set of non-filled enabled attributes.

2. The method of claim 1, further comprising:

identifying, for each of the non-filled enabled attributes identified by the comparing, one or more corresponding values; and for each identified value of the one or more corresponding values:

determining whether or not the selection of the at least one of the one or more values provided for display would return at least one result item; and removing, upon determining that the selection would not return at least one result item, the at least one of the one or more values provided for display from the set of values corresponding to the set of non-filled enabled attributes, such that the updated one or more values for display does not contain values that, if selected, would not return at least one result item.

3. The method of claim 1, wherein the updated one or more values for display does not comprise values corresponding to a filled attribute such that values corresponding to filled attributes are not displayed.

4. The method of claim 1, wherein for each of the plurality of enabling relationships, a given enabled attribute is enabled by the current query state when a value of the at least one associated attribute-value pairs is selected.

5. The method of claim 4, wherein at least one of the plurality of enabling relationships comprises at least two different attribute-value pairs associated with one or more attribute values.

6. The method of claim 4, wherein at least two of the plurality of enabling relationships comprise the same attribute-value pairs associated with different attribute values.

7. A non-transitory computer readable storage medium having computer executable instructions stored thereon, that are executable by a computer to cause:

storing, in a memory, a plurality of attributes and a plurality of values, wherein a plurality of attribute-value pairs each indicate a correspondence between at least one respective attribute and at least one respective value;

storing, in the memory, a plurality of enabling relationships, wherein one or more of the plurality of enabling relationships indicate a respective attribute of the plurality of attributes enabled by a respective attribute-value pair;

providing, one or more values for display from the plurality of values;

receiving a selection of at least one of the one or more values provided for display;

providing, in response to the selection, an updated one or more values for display wherein said providing the updated one or more values comprises:

identifying a current query state corresponding to the selected at least one of the one or more values provided for display;

identifying, based on the selected at least one of the one or more values provided for display, an attribute-value pair of the plurality of attribute-value pairs;

identifying, based on the identified attribute-value pair, an enabling relationship from the plurality of enabling relationships;

identifying, based on the identified enabling relationship, a set of attributes enabled by the current query state;

identifying a set of attributes filled for the current query state; and comparing the set of attributes enabled and the set of attributes filled to identify a set of non-filled enabled attributes, wherein the updated one or more values for display comprise the set of values corresponding to the set of non-filled enabled attributes.

8. The computer readable storage medium of claim 7, the computer executable instructions further configured to cause:

identifying, for each of the non-filled enabled attributes identified by the comparing, one or more corresponding values; and for each identified value of the one or more corresponding values:

determining whether or not the selection of the at least one of the one or more values provided for display would return at least one result item; and removing, upon determining that the selection would not return at least one result item, the at least one of the one or more values provided for display from the set of values corresponding to the set of non-filled enabled attributes, such that the updated one or more values for display does not contain values that, if selected, would not return at least one result item.

9. The computer readable storage medium of claim 7, wherein the updated one or more values for display does not comprise values corresponding to a filled attribute such that values corresponding to filled attributes are not displayed.

10. The computer readable storage medium of claim 7, wherein for each of the plurality of enabling relationships, a given enabled attribute is enabled by the current query state when a value of the at least one associated attribute-value pairs is selected.

11. The computer readable storage medium of claim 10, wherein at least one of the plurality of enabling relationships comprises at least two different attribute-value pairs associated with one or more attribute values.

12. The computer readable storage medium of claim 10, wherein at least two of the plurality of enabling relationships comprise the same attribute-value pairs associated with different attribute values.

13. A computer system, comprising:

a memory;

a refinement processor configured to:

store, in the memory, a plurality of attributes and a plurality of values, wherein a plurality of attribute-value pairs each indicate a correspondence between at least one respective attribute and at least one respective value;
store, in the memory, a plurality of enabling relationships,
wherein one or more of the plurality of enabling relationships indicate a respective attribute of the plurality of attributes enabled by a respective attribute-value pair;
provide, one or more values for display from the plurality of values;
receive a selection of at least one of the one or more values provided for display;
provide, in response to the selection, an updated one or more values for display wherein said providing the updated one or more values comprises:
identify a current query state corresponding to the selected at least one of the one or more values provided for display;
identify, based on the selected at least one of the one or more values provided for display, an attribute-value pair of the plurality of attribute-value pairs;
identify, based on the identified attribute-value pair, an enabling relationship from the plurality of enabling relationships;
identify, based on the identified enabling relationship, a set of attributes enabled by the current query state;
identify a set of attributes filled for the current query state; and
compare the set of attributes enabled and the set of attributes filled to identify a set of non-filled enabled attributes,
wherein the updated one or more values for display comprise the set of values corresponding to the set of non-filled enabled attributes.

14. The computer system of claim 13, wherein the refinement processor is further configured to:
identify, for each of the non-filled enabled attributes identified by the comparing, one or more corresponding values; and
for each identified value of the one or more corresponding values:
determining whether or not the selection of the at least one of the one or more values provided for display would return at least one result item; and
removing, upon determining that the selection would not return at least one result item, the at least one of the one or more values provided for display from the set of values corresponding to the set of non-filled enabled attributes, such that the updated one or more values for display does not contain values that, if selected, would not return at least one result item.

15. The computer system of claim 13,
wherein for each of the plurality of enabling relationships, a given enabled attribute is enabled by the current query state when a value of the at least one associated attribute-value pairs is selected.

16. The computer system of claim 15, wherein at least one of the plurality of enabling relationships comprises at least two different attribute-value pairs associated with one or more attribute values.

17. The computer system of claim 15, wherein at least two of the plurality of enabling relationships comprise the same attribute-value pairs associated with different attribute values.

* * * * *